June 15, 1971  B. G. BJALME  3,584,344
PIPE FLARING TOOL
Filed Aug. 29, 1969
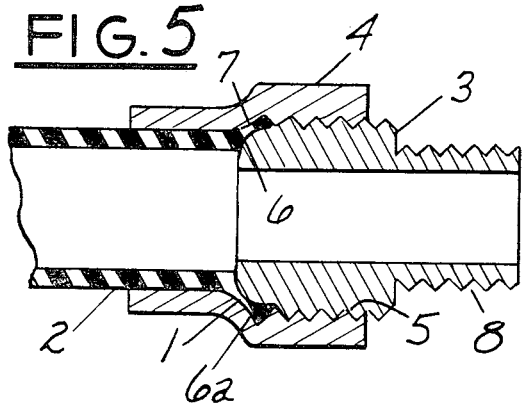
FIG. 5
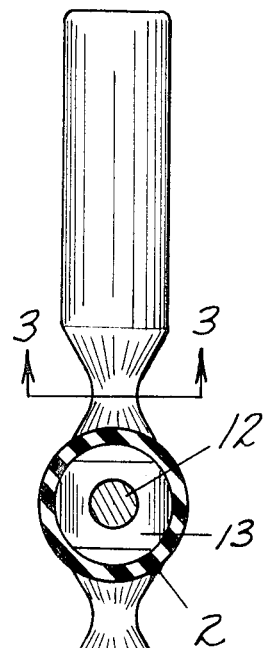
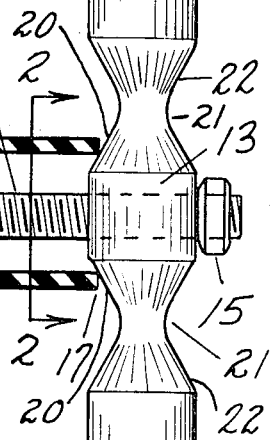
FIG. 1
FIG. 2
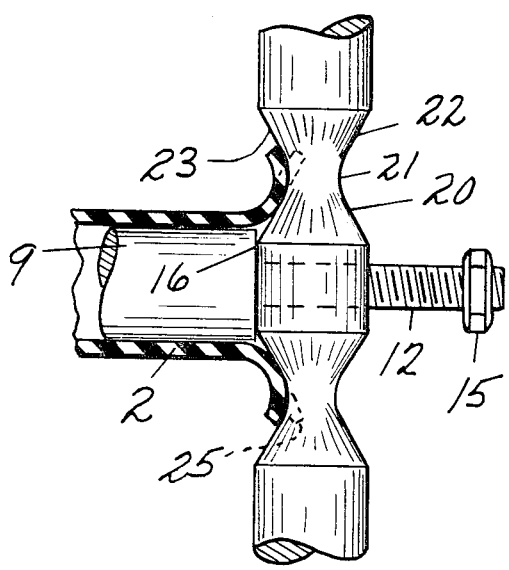
FIG. 4
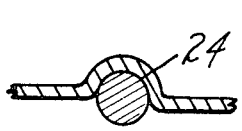
FIG. 6
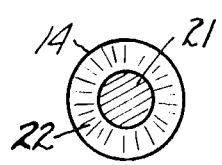
FIG. 3
INVENTOR.
Bengt G. Bjalme
BY
Ralph Hammar
Attorney

United States Patent Office 3,584,344
Patented June 15, 1971

3,584,344
PIPE FLARING TOOL
Bengt G. Bjalme, Erie, Pa., assignor to Reed
Manufacturing Company, Erie, Pa.
Continuation-in-part of applications Ser. No. 796,518,
Feb. 4, 1969, and Ser. No. 828,260, May 27, 1969.
This application Aug. 29, 1969, Ser. No. 854,060
Int. Cl. B29c 17/00; B21d 41/02
U.S. Cl. 18—19                                                   9 Claims

ABSTRACT OF THE DISCLOSURE

A tool for flaring thermoplastic pipe having an arbor received in the bore of the pipe, a cross bar handle having rounded surfaces engaging the pipe end and locally stretching and flexing it axially inward and radially outward into a flare and a screw threaded connection between the handle and the arbor for feeding the handle toward the arbor as the handle is rotated.

---

This is a continuation-in-part of applications Ser. No. 796,518 filed Feb. 4, 1969 and Ser. No. 828,260 filed May 27, 1969, incorporated by reference.

This invention is a tool for flaring rigid and flexible thermoplastic pipe or tubing such as used for water service. In a preferred form the tool consists of an arbor anchored in the bore of the pipe, a handle extending diametrically across the axis of the pipe and having curved surfaces locally engaging the end of the pipe and a screw threaded connection between the arbor and the handle for feeding the handle axially as it is rotated relative to the arbor. As the handle is rotated, the curved surfaces locally engage diametrically opposed portions of the pipe end and locally flex the plastic both radially and axially. The internal heating due to the repeated flexing of the plastic causes the plastic to take a permanent set.

In the drawing, FIG. 1 is a side elevation partly in section showing the tool inserted in a pipe end in readiness for a flaring operation, FIG. 2 is a section on line 2—2 of FIG. 1, FIG. 3 is a section on line 3—3 of FIG. 2, FIG. 4 is a fragmentary sectional view showing the position of the tool at the end of the flaring operation, FIG. 5 is a section through a pipe end flared with the tool and installed in a standard flare fitting such as used by the American Water Works Association and others, and FIG. 6 is a diagrammatic view illustrating the action of the tool.

The particular tool illustrated is intended to produce a flared end 1 on a pipe 2 of flexible thermo plastic such as polybutylene, polyethylene, polyvinyl, etc. Such plastic pipe is difficult to flare because the plastic resists flowing and tends to return to its initial unflared shape by reason of its memory. Heretofore, for polyethylene and rigid polyvinyl, hot flaring tools have been used in which the section to be flared is heated above its softening point. Heretofore it has been considered that polyvinyl and polyethylene could not be cold flared. For polybutylene, cold flaring has been used but the flares have been weak and the effort required has been huge.

The flared end is required for the standard A.W.W.A. type fitting comprising an inner member 3 and an outer member 4. The outer member is in the form of a nut screwed onto threads 5 on the inner member. As the fitting is tightened, the flared end is squeezed between opposed convex surfaces 6 and 7 respectively on the inner and outer members. The inner member 3 has a threaded projection 8 for connection to water service line. The fitting part 3 is standard for copper tubing for which the plastic tubing 2 is a replacement. The fitting part 4 has convex surface 7 to adapt it to plastic tubing. The opposed convex surfaces 6, 7 cooperate to form a bead 6a which holds the tubing in place under pull-out forces.

The tool shown in FIGS. 1–4 inclusive has a cylindrical arbor or plug 9 having a sliding fit in the bore of the pipe or tubing 2 to be flared. The plug has a reduced diameter externally threaded projection 12 on which is screwed the hub 13 of a flaring head having diametrically opposed spokes or handles projections 14. The handle is conveniently made from bar stock. For sizes of pipe one inch or larger a handle extension 14a may be provided. The plug 9 and handle 14 form a T with the handle being the head and the plug the stem of the T. Rotation of the hub relative to the projection 12 causes it to move axially between a collar 15 pinned to the outer end of the projection and an annular shoulder 16 at the inner end of the projection. In order to insure the proper size of flare, the flaring head is rotated until the hub 13 stops against the collar 15 and the plug is inserted in the bore of the pipe until the end 17 of the pipe stops against the hub as shown in FIG. 1. The free or unsupported pipe end projecting beyond the annular shoulder 16 on the plug 9 provides the proper material allowance for the flare. When the plug is adjusted to the described position, clamping jaws 18 and 19 are tightened against the outside of the pipe, clamping the pipe between the jaws and the plug and rigidly supporting the pipe behind the annular shoulder 16. Substantially the entire section of the pipe between the plug and the jaws is subjected to a radial clamping pressure. The jaws 18, 19 can be on any suitable pliers, clamp or vise. After clamping, the jaws 18, 19, the plug 12 and the intervening wall of the pipe section are in fixed relation to each other.

After the jaws 18, 19 are tightened, the free end of the pipe is flared by rotating the flaring head in the direction to feed the tool axially toward the pipe. This is conveniently done by the handle projections 14. The initial contact of the pipe end 17 is with the inclined surface 20 which diverges outward and away from the pipe end at an acute angle to the axis of the pipe. As the flaring progresses, the pipe end successively contacts reverse curved or concave surface 21 and then surface 22 which is inclined at an obtuse angle to the axis of the pipe. This results in local overflaring of the pipe with the outer edge or rim 23 of the flare tending to curl as shown in FIG. 4. The flaring head exerts both an axial and a radial force on the pipe end so the plastic in the flare is both stretched to a larger diameter and compressed toward the portion of pipe gripped between the jaws 18, 19 and the plug. For ease of machining, the surfaces 20 and 23 are conical. The surface 21 is a radius connecting the conical surfaces. The surfaces 20, 21 and 22 are convex in circumferential cross section.

As the spinning tool or flaring head 4 sweeps about the axis of the pipe it exerts a local flaring pressure on the pipe end deflecting the plastic in contact with the tool both axially and radially out of line with the remainder of the pipe end as shown at 24 in FIG. 6. As the tool passes one section and starts to deflect an adjoining section, the previously deflected section tends to return to its undeflected position. The tool causes a local back and forth movement or flexing of the plastic which generates internal heating of the plastic which reduces the tendency of the plastic to spring back. At each point of contact, the plastic is locally deformed by the pressure exerted by the flaring head and as the head sweeps past, the plastic does not return completely.

The flare is accordingly made progressively in a plurality of revolutions. An apparently rigid plastic such as polyvinyl is very easily flared, as are the other thermo plastics used for water service such as polyethylene, polybutylene, etc. Thermo plastics do not have a yield point, as is the case with metals. Even after huge deflections there is no permanent set. The plastic by reason of its memory tends to return to the undeflected position. However, the local internal heating resulting from successive contacts with the convex surfaces 20, 21, 22 overcomes the memory and results in a permanent flare. At the end of the flaring operation, the hub 13 of the flaring head is in contact with the annular stop surface 16. At this stage, rotation of the tool is reversed to return it to the original position. There is some frictional contact with the flared rim at the initial reversal which improves the quality of the flare. In FIG. 4, the flare is shown in its final or over flared condition. After the spring back of the plastic from the over flared condition, the finished flare assumes the position shown in dotted lines in FIG. 4 which will fit the standard flare fitting for tubing. Preferably the rim 25 of the flare has a diameter slightly greater than the inside diameter of the threads in the nut 4 of the fitting so the rim of the flare will be under both radial and axial compression when installed.

At the end of the flaring operation, the flare will be warm to touch. This indicates that there is a localized heating at the regions of contact of the spinning tool with the pipe end which causes local flowing of the pipe end and produces a sort of permanent set which reduces the amount of spring back at the end of the flaring operation. The flares produced by this tool are stronger than the pipe. The axial compression of the flare may contribute to the strength. In the previous flaring tools used for plastic water pipe, after assembly into a flare fitting as shown in FIG. 5, stress on the pipe always caused breaking at the flare. With the flare produced by the tool of this application, stress on the pipe produces breakage in the pipe itself rather than in the flare. Not only is the flare produced by the tool stronger than previous flares, but the power required to produce a flare is very slight compared to the power requirements for previous flaring tools. For sizes up to one inch, the handle extension 14a is not needed.

Because the wall of the pipe adjacent the end being flared is securely clamped between the internal arbor or plug 9 and the external clamp 18, 19, the flares produced by the tool are very uniform. The action of the flaring head is confined to the unsupported projecting end of the pipe.

The tool is adapted to produce flares on all sizes of thermo plastic pipe and for all standard flare fittings. No special fittings are required.

The flares produced by the tool are uniform. The collar 15 accurately controls the material allowance to be used for the flares. The shoulder 16 accurately terminates the flare. The screw threads on projection 12 provide a uniform feed rate preventing wrinkling of the material.

The heat developed by this tool is due to external and internal friction and is sufficient to heat the immediate contacting surfaces between the pipe and the tool. There is no overall softening of the plastic.

In use, the contact between the flaring head and the pipe is confined to the surfaces 20, 21, 22 (FIG. 4), each of which is of arcuate cross section. The contact with the plastic is confined to a narrow section of the surfaces approaching line contact as shown in FIG. 6. The plastic in contact with the tool is deflected both axially and radially. While the tool is shown as having conical surfaces, this is not necessary. The portions of the tool out of contact with the pipe may obviously be of any suitable shape having the required strength.

By appropriate changes in dimensions to increase the amount of over-flare, it is possible to over flare the pipe to such an extent that the flare has a 180° reverse curve with the rim extending backward from the end of the pipe.

What I claim is:

1. A pipe flaring tool for thermo plastic pipe comprising arbor means adapted to be received in the bore of a pipe adjacent the pipe end to be flared, a flaring head, a screw connection between the flaring head and the arbor for causing axial movement of the flaring head relative to the arbor as the flaring head is rotated relative to the arbor, said flaring head having spokes serving as handles for turning the head, the spokes having surfaces transverse to said axis locally engaging and progressively flexing or deflecting the wall of the free end of the pipe both axially toward the arbor and radially outward from the axis of the pipe by relative rotation and axial movement of the flaring head about the axis of the pipe and toward the arbor.

2. The tool of claim 1 in which the screw connection comprises a screw threaded projection on the arbor on which the flaring head is screwed.

3. The tool of claim 1 in which the surfaces engaging the pipe end are inclined at an acute angle to the axis of the pipe adjacent the bore of the pipe and at an obtuse angle to the axis of the pipe radially outward from the bore of the pipe.

4. The tool of claim 1 in which the spokes are diametrically opposed and form a T with the arbor.

5. The tool of claim 1 in which the surfaces engaging the pipe and are inclined at an acute angle to the axis of the pipe adjacent the bore of the pipe and in which the angle of inclination is greater radially outward from the bore of the pipe.

6. The tool of claim 1 in which the surfaces engaging the pipe and are convex in circumferential cross section.

7. The tool of claim 1 in which the surfaces engaging the pipe end which is convex in circumferential cross section and concave in radial cross section in a plane including the axis of the pipe.

8. The tool of claim 4 in which the flaring head has a hub opposite the pipe end and the screw connection is between the hub and the arbor.

9. The tool of claim 8 in which the surfaces comprise grooves in the spokes with the sides of the grooves adjacent the hub making an acute angle with the axis of the pipe and the side of the groove remote from the hub making an obtuse angle with the axis of the pipe.

References Cited

UNITED STATES PATENTS

| 1,732,324 | 10/1929 | Beardsley | 18—19X |
| 1,661,367 | 3/1928 | Helminiok. | |
| 3,299,837 | 1/1967 | Lind | 18—9 |
| 3,341,894 | 9/1967 | Flaming | 18—19 |
| 3,466,707 | 9/1969 | Click et al. | 18—19 |

J. HOWARD FLINT, Jr., Primary Examiner

U.S. Cl. X.R.

72—317